Patented Sept. 13, 1938

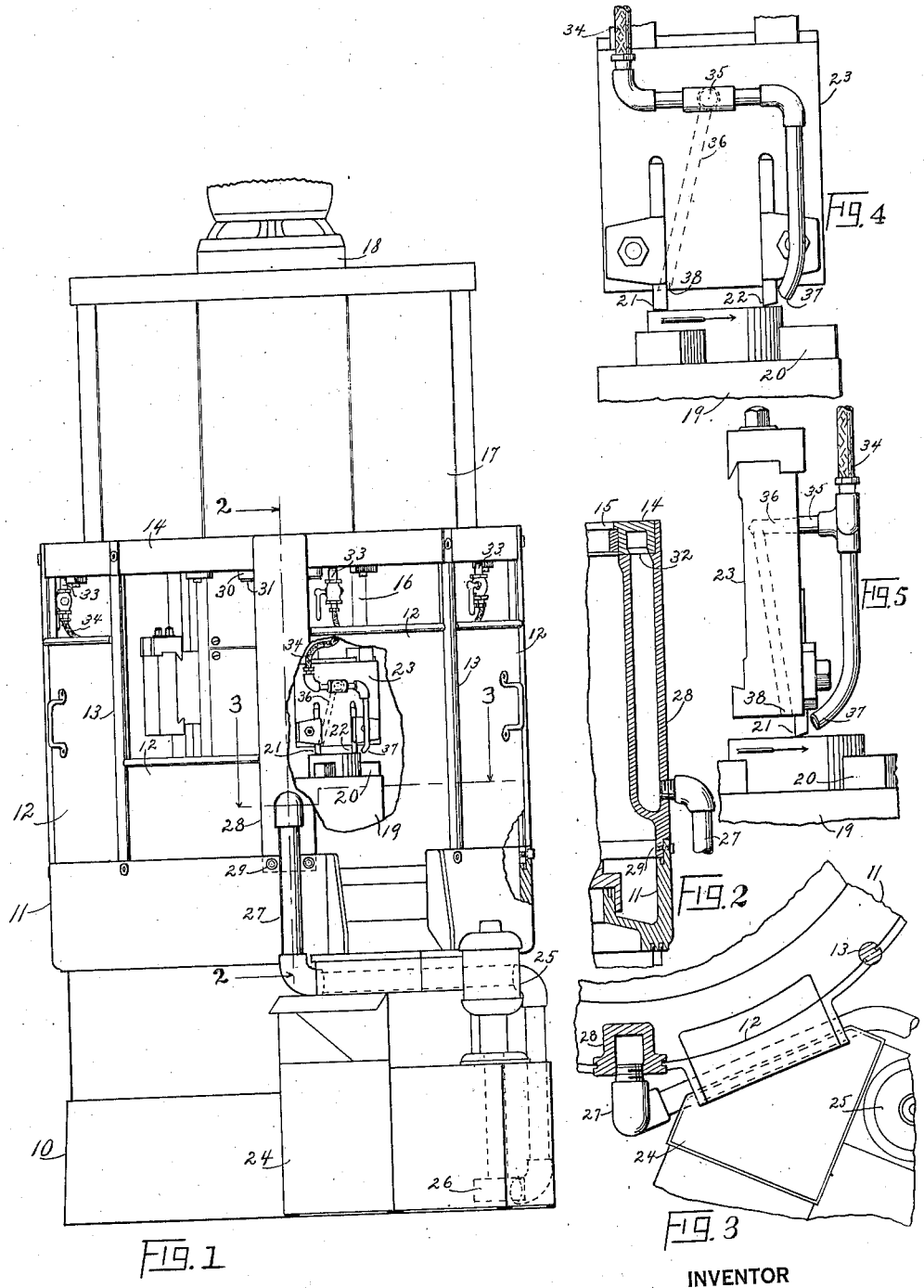

2,129,815

UNITED STATES PATENT OFFICE 2,129,815

MACHINE TOOL COOLANT DISTRIBUTION

Edward P. Bullard, III, Fairfield, Conn., assignor to The Bullard Company, a corporation of Connecticut Application March 10, 1937, Serial No. 130,112

4 Claims. (Cl. 29—38)

This invention relates to the distribution of coolant fluid to the cutting edges of the metal working tools of a machine tool.

While the invention is broadly applicable to a wide variety of metal working tools, it is particularly applicable to machines incorporating a carrier provided with a number of work-holders to which is imparted a step-by-step motion, placing the work carried by the spindles in position to be acted upon by various sets of tools associated with the column.

One of the objects of the invention is to provide a coolant discharge means movable with the tool holding block whereby the coolant will be constantly distributed upon the cutting blade regardless of the movements thereof.

Still another object is to convey coolant fluid to the cutting edges of tools by means of ducts bored in the tool holding fixtures.

Another object of this invention is to provide a novel means to convey coolant fluid to the several tool heads of a multiple work-holder machine by the use of a circumferential coolant passage-way providing a convenient medium from which coolant fluid may be discharged to the tools at each station by short and direct tubing.

Another object is to provide a hollow stanchion forming a part of the general machine structure and providing convenient means to convey the coolant from a storage tank to the circumferential passage-way thereby requiring a minimum of outside piping.

Other objects will, hereinafter, become apparent from the following description, referring to the accompanying drawing, in which:

Figure 1 is a front elevation of a multiple station machine, partly cut away, embodying the present invention.

Figure 2 is a section of the stanchion taken on line 2—2 of Figure 1.

Figure 3 is a top view of the coolant storage tank taken on line 3—3 of Figure 1.

Figure 4 is an enlarged detail of one head of a multiple station machine; and

Figure 5 is a side view of the tool head shown in Figure 4.

In the drawing, 10 represents a base of a multiple spindle lathe in which the tool coolant means has been incorporated. A chip guard 11, surrounding the machine, acts as a support for movable splash guards 12. The guards also are further supported in an upright position by fitting slidably into grooved rods 13 attached to the chip guard 11 and a circumferential fluid coolant passage-way, or conveyor, 14. The conveyor 14 is supported by a flange 15 secured to a column 16. Above the conveyor 14, enclosed within slidable guards 17, are the feed works to operate the tool heads. The machine may be provided with driving means such as a motor 18 located on the top of the machine.

The machine illustrated is provided with eight spindles each carrying a work holding chuck; one chuck, 19, being disclosed through the cut-away opening in the guard 12. A rotatable carrier, not shown, carries the work-holders in a step-by-step motion from one station to another into operative position with various tools carried by the column and operated by the feed works enclosed within the guards 17. For a more detailed description of the feed works, carrier and spindles, reference is made to the machine disclosed in the copending application filed October 30, 1936, Serial No. 108,494.

The disclosed chuck 19 as well as the chucks not shown are adapted to carry work-holders 20 suited to the particular work at hand. Cutting tools 21 and 22, attached to a tool slide 23, may be fed either horizontally, or vertically, by feed works in the upper part of the machine, according to the requirements of the piece to be worked.

It will be noted that, in the illustration of the work piece disclosed in the drawing, the cutting edge of the tool 22 is on the front side of the tool, while the cutting edge of the tool 21 is on the rear side of the tool.

The coolant distributing system, equipped with a motor 25 and a pump 26, comprises a supply reservoir 24 located close to the base of the machine. The coolant fluid is fed from the pump 26, by suitable piping 27, to a hollow stanchion 28; the lower end being closed and fastened to the chip guard 11 by bolts 29. The upper end of the stanchion 28 is open and is supplied with lugs 30 for securement to the conveyor 14, by bolts 31, in alignment with an opening 32. At suitable locations on the underside of the conveyor 14, distributing pipes 33 may be tapped. The various branch lines may be rigid piping or incorporated with a flexible tube 34 similar to the one illustrated. Some part of the line may be secured to the movable tool slide 23 by a branch line 35 tapped into a bore 36, or other means, to keep the relative position of a nozzle 37 and the tool 22 constant.

Various branch pipes may be added to the line to supply fluid to tools in various positions. In that embodiment of the invention disclosed in the drawing, the branch line 35 is connected to the bore 36 in the tool slide 23. An outlet 38 of the bore 36 is so located as to permit the coolant fluid to be delivered to the cutting edge at the back of the tool 21 with sufficient force and volume to keep the tool cool.

From the foregoing it will be seen that the distribution system provides a fluid reservoir situated at the side of the machine, a pipe line from the reservoir including a hollow stanchion forming an integral part of the machine, an annular closed conveyor surrounding the column to which pipe lines may be tapped for various tools, ducts bored in the tool holding slides to convey fluid to cutting edges of tools not reached by any other piping and a chip and splash guard to collect, and return, the coolant to the reservoir.

It will be understood that the invention is not limited to the structural details herein illustrated, but that numerous changes, modifications and the full use of equivalents may be resorted to without departure from the spirit, or scope, of the appended claims.

Having set forth the nature of my invention, what I claim is:

1. In a machine tool of the character set forth, the combination with a coolant passage-way and means for delivering coolant therefrom to the tool-holders, of a stanchion forming an integral part of said machine tool and providing therein a conduit for delivering coolant to said passage-way.

2. In a machine tool having a central column, a carrier rotatably mounted thereon, a plurality of work-holders mounted upon said carrier, movable tool-holders mounted to operate upon work mounted in said work-holders, a stationary coolant passage-way, a stanchion forming part of said machine tool structure and forming a conduit for delivering coolant to said passage-way and distributing means adapted to deliver coolant fluid to the tool-holders from said passage-way.

3. In a vertical, multiple operation machine tool, the combination with a rotary work-holding carrier and a plurality of tool-holders, of a stationary circumferential coolant passage-way, a hollow stanchion forming part of the machine tool structure and adapted to deliver coolant to said passage-way and distributing means adapted to deliver coolant from said passage-way to tools carried by said tool-holders.

4. In a multiple spindle, station type, vertical machine tool, the combination with a step-by-step moving rotary spindle carrier and a plurality of spindles carried thereby, of a plurality of moving tool heads adapted to carry tools for operation on work carried by said spindles, a fixed circumferential coolant passage-way above said carrier, a hollow stanchion forming part of the machine tool structure and adapted to deliver coolant to said passage-way and flexible distributing means adapted to deliver coolant from said passage-way to the tool-holders, said means being movable with the tool-holders and ducts in said tool-holders for discharging fluid from said distributing means to the tools carried thereby.

EDWARD P. BULLARD, III.